US008295669B2

(12) United States Patent
Park et al.

(10) Patent No.: US 8,295,669 B2
(45) Date of Patent: Oct. 23, 2012

(54) COMPACT OPTICAL FIBER SPLICE HOLDER DEVICE (75) Inventors: Chansool Park, Seoul (KR); Donald K. Larson, Cedar Park, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 357 days.

(21) Appl. No.: 12/548,601

(22) Filed: Aug. 27, 2009

(65) Prior Publication Data

US 2011/0052131 A1    Mar. 3, 2011

(51) Int. Cl.
G02B 6/255 (2006.01)
G02B 6/00 (2006.01)
(52) U.S. Cl. .............................. 385/135; 385/95; 385/99
(58) Field of Classification Search .................. None
See application file for complete search history.

(56) References Cited

U.S. PATENT DOCUMENTS

| | | | |
|---|---|---|---|
| 4,155,624 A * | 5/1979 | Logan et al. ..................... 385/65 |
| 4,629,284 A | 12/1986 | Malavielle |
| 4,824,197 A | 4/1989 | Patterson |
| 4,892,378 A * | 1/1990 | Zajac et al. ..................... 385/78 |
| 5,102,212 A | 4/1992 | Patterson |
| 5,138,681 A | 8/1992 | Larson et al. |
| 5,155,787 A | 10/1992 | Carpenter et al. |
| 5,159,653 A | 10/1992 | Carpenter et al. |
| 5,185,844 A * | 2/1993 | Bensel et al. ................. 385/135 |
| 5,321,784 A | 6/1994 | Cubukciyan et al. |
| 5,337,390 A | 8/1994 | Henson et al. |
| 6,035,090 A | 3/2000 | Kawaguchi et al. |
| 6,238,104 B1 | 5/2001 | Yamakawa et al. |
| 6,953,287 B2 | 10/2005 | Cox |
| 7,140,787 B2 | 11/2006 | Yamauchi et al. |
| 7,234,878 B2 | 6/2007 | Yamauchi et al. |
| 7,280,733 B2 | 10/2007 | Larson |
| 7,369,738 B2 | 5/2008 | Larson et al. |
| 7,393,148 B2 * | 7/2008 | Allen et al. ..................... 385/99 |
| 7,785,017 B2 * | 8/2010 | Barnes et al. ................... 385/72 |
| 2003/0224657 A1 * | 12/2003 | Malloy ......................... 439/578 |
| 2006/0067637 A1 | 3/2006 | Carpenter et al. |
| 2006/0072884 A1 * | 4/2006 | Yamauchi et al. ............. 385/98 |
| 2006/0269209 A1 * | 11/2006 | Mullaney et al. ............ 385/135 |
| 2010/0014817 A1 * | 1/2010 | Liu ................................. 385/99 |

FOREIGN PATENT DOCUMENTS

| | | |
|---|---|---|
| JP | 06-002307 U | 1/1994 |
| JP | 2000-065271 A | 3/2000 |
| JP | 3445479 | 9/2003 |
| JP | 2003-322762 A | 11/2003 |
| JP | 2005-062514 A | 3/2005 |
| JP | 2007-121878 A | 5/2007 |
| KR | 10-2009-0064260 | 6/2009 |

(Continued)

Primary Examiner — Tina Wong
(74) Attorney, Agent, or Firm — Gregg H. Rosenblatt (57) ABSTRACT An optical fiber splice holder device for connecting jacketed optical fiber cables includes a cover and a main body that houses a splice device therein. The splice device is configured to splice a first fiber end to a second fiber end. The main body also includes first and second fiber jacket clamping portions disposed at first and second ends of the main body to clamp a respective fiber's jacket portion that surrounds a portion of the respective fiber upon actuation. The optical fiber splice device also includes first and second fiber jacket boots that are attachable to the main body at the first and second ends of the main body. The boots each actuate the respective fiber jacket clamping regions of the optical fiber cables upon attachment to the main body.

13 Claims, 10 Drawing Sheets

FOREIGN PATENT DOCUMENTS

| WO | WO 2006/019515 A1 | 2/2006 |
| --- | --- | --- |
| WO | WO 2006/019516 A1 | 2/2006 |
| WO | WO 2009/099738 A1 | 8/2009 |
| WO | WO 2009/111176 A1 | 9/2009 |
| WO | WO 2009/148797 A1 | 12/2009 |

* cited by examiner

COMPACT OPTICAL FIBER SPLICE HOLDER DEVICE

BACKGROUND

1. Field of the Invention

The present invention is directed to a compact optical fiber splice holder device.

2. Related Art

Mechanical devices for connecting and/or splicing optical fibers for the telecommunications industry are known. These devices can be part of an optical fiber network such as a FTTH (Fiber to the Home) network. For example, conventional devices are described in U.S. Pat. Nos. 4,824,197; 5,102,212; 5,138,681; 5,159,653; 5,337,390; and 5,155,787.

Another preferred conventional splicing method is fusion splicing. In large deployments, many splices are required to be made in many different areas of the city at the same time. However, as fiber optics are being deployed deeper into the metro and access areas of the network, splicing in these areas of the network are often performed in the air, in cramped closets, and in difficult-to-maneuver locations. Fusion splicing in these types of locations is difficult, and often there is no power available for fusion splicing machine, thus requiring battery power. Also, if many locations are scheduled in a given day, many different installation crews will require fusion splicing machines, resulting in a capital investment for the installation company.

In recent years, a mechanical field-mountable optical fiber connecting structure has become more desirable. The connecting structure can have a mechanical splice structure therein. This structure can be used to permanently connect ends of naked optical fibers to each other such that the ends of the fibers abut each other, without fusion welding or adhering. For example, PCT Publ. No. WO2009/111176 provides an example mechanical splice (this device may also be referred to as a mechanical splice-type connector).

SUMMARY

According to a first aspect of the present invention, an optical fiber splice holder device for connecting jacketed optical fiber cables is provided. The optical fiber splice holder device includes a cover and a main body that houses a splice device therein, where the splice device is configured to splice a first fiber end to a second fiber end. The main body also includes first and second fiber jacket clamping portions disposed at first and second ends of the main body to clamp a respective fiber's jacket portion that surrounds a portion of the respective fiber upon actuation. The optical fiber splice device also includes first and second fiber jacket boots that are attachable to the main body at the first and second ends of the main body. The boots each actuate the respective fiber jacket clamping regions of the optical fiber cables upon attachment to the main body.

In a preferred aspect, the splice device comprises a mechanical splice device.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE EMBODIMENTS

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "forward," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention.

The present invention is directed to an optical fiber splice holder device. In particular, the optical fiber splice holder device of the exemplary embodiments is of rugged construction, compact length and is capable of being utilized in straightforward field splicing. Further, the straightforward field splicing can be accomplished without the use of a separate field termination platform or separate crimping tool. The exemplary splice holder device(s) described herein can be readily installed and utilized for Fiber To The Home (FTTH) and/or Fiber To The X (FTTX) network installations. The exemplary splice device(s) can be utilized in installation environments that require ease of use, especially where labor costs are more expensive. In addition, the splice holder device can be utilized with different types of jacketed drop cables, such as conventional 3 mm drop cable and rectangular (in cross section) 2 mm×3 mm FRP cable. Further, the splice holder device can be utilized for repairs of broken drop cables in the field.

Figure 1A:
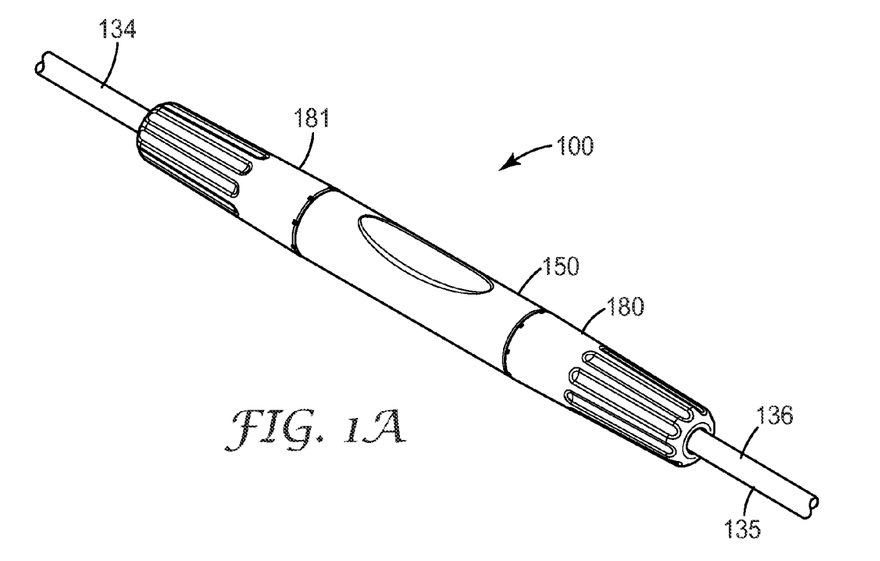
FIG. 1A is an isometric view of an exemplary optical fiber splice holder device according to an aspect of the invention.
Figure 1B:
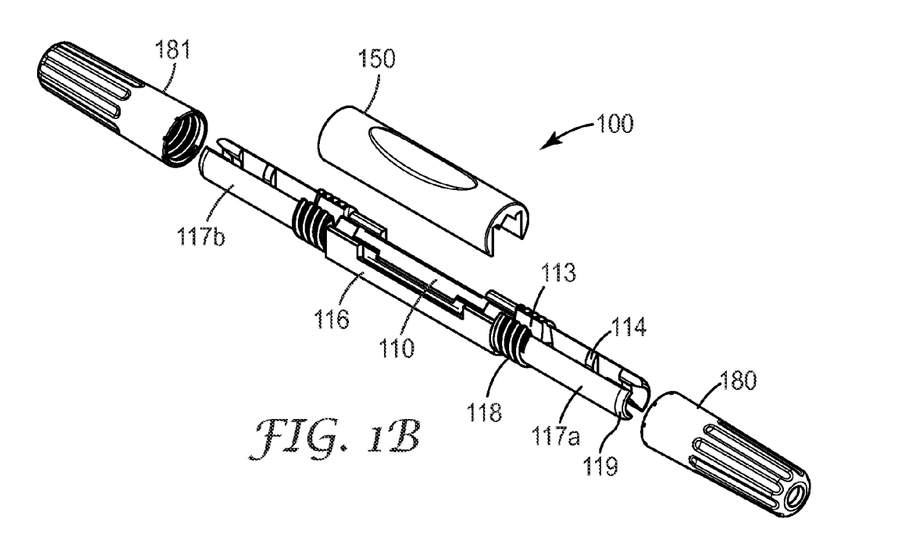
FIG. 1B is a partial exploded view of an exemplary optical fiber splice holder device according to an aspect of the invention.

According to an exemplary embodiment of the present invention, an optical fiber splice holder device 100 is shown in isometric view in FIG. 1A and in exploded view in FIG. 1B. Individual components of the optical fiber splice holder device 100 are shown in more detail in FIGS. 4A, 4B, 5, and 6. A sequence for performing a splicing operation with the exemplary optical fiber splice holder device 100 are shown in FIGS. 2A-2F.

Optical fiber splice holder device 100 completes and houses a splice made between two optical fiber cables, here cables 134 and 135. The fibers within each cable are spliced by a splice device 110, described in further detail below, which is nested inside a splice holder main body (or backbone) 116. In a preferred aspect, the splice device 110 comprises a mechanical splice device and the splice holder embodiments herein will be described with respect to a mechanical splice device. However, in an alternative aspect, splice holder device 100 can house a fusion splice, as would be apparent to one of ordinary skill in the art given the present description.

A cover 150 can be utilized to actuate and enclose the mechanical splice device 110 within the main body 116. The splice holder main body 116 includes two cable jacket clamping regions 117a and 117b disposed on either side of the mechanical splice 110. Each cable jacket clamping region engages with a respective cable jacket boot 180, 181 that clamps the respective fiber cables in place with respect to the splice.

In this exemplary embodiment, splice holder device 100 can be utilized to splice two field optical fiber cables 134, 135. Optical fiber cables 134, 135 are jacketed cables that each include an outer jacket 136, a buffer portion 137 (e.g., with a buffer coating or the like), a bare fiber portion (e.g., the bare clad/core, not shown), and strength members (not shown). Fiber cables 134, 135 can each comprise a standard single mode or multimode optical fiber, such as SMF 28 (available from Corning Inc.). In a preferred aspect, the strength members comprise aramid, Kevlar, or polyester yarn or strands disposed between an inner surface of the fiber jacket 136 and an outer surface of coated portion 137.

Figure 4A:
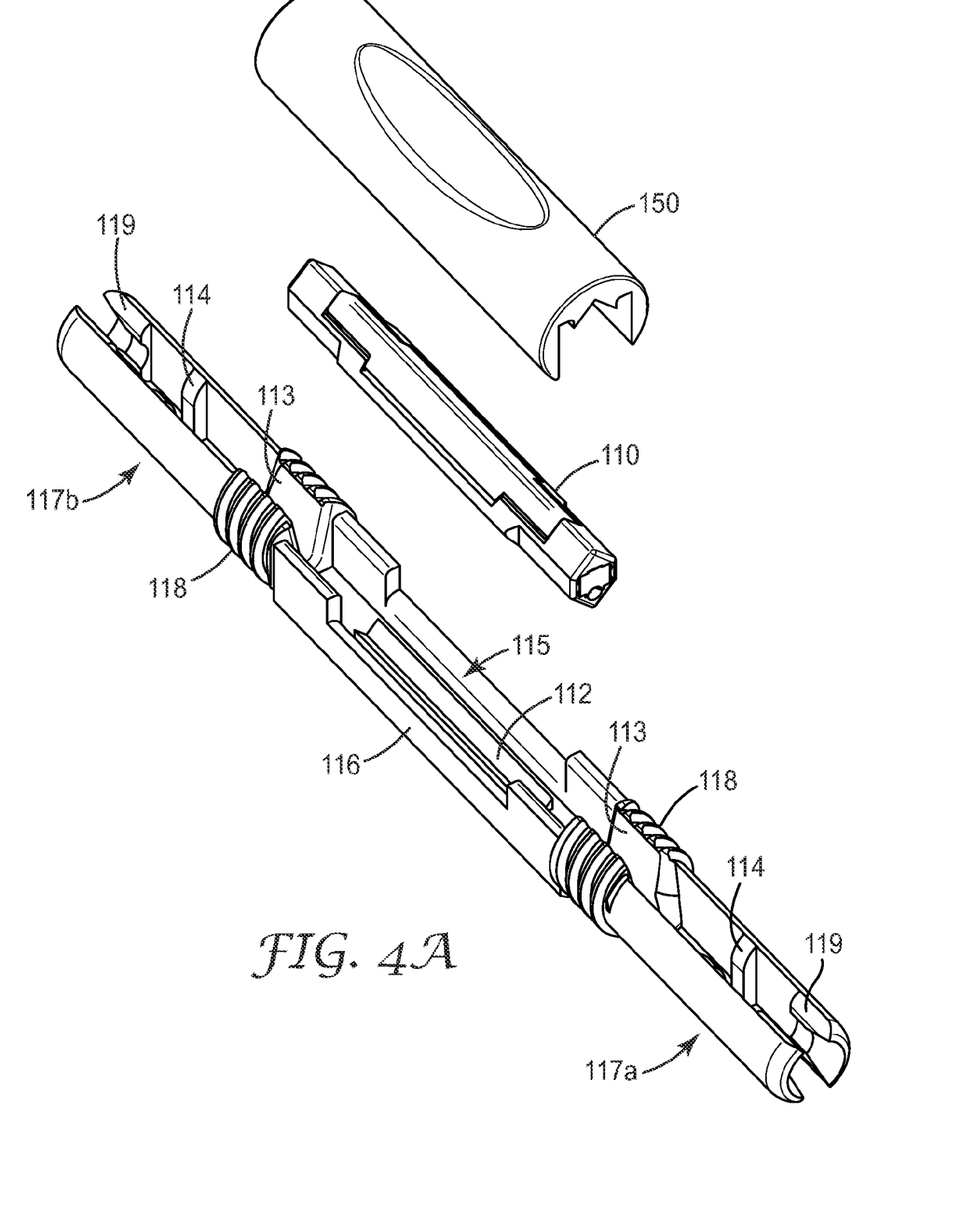
FIG. 4A is an exploded view of the cover, mechanical splice device and the main body of the splice holder device according to an aspect of the invention.

The main body 116 provides structural support for the splice holder device 100. As shown in FIG. 4A, the main body 116 is an elongated structure (preferably having a length of from about 76 mm to about 95 mm, and more preferably about 92 mm) and a generally cylindrical shape with a continuous axial bore to permit passage of the optical fibers being spliced. Main body 116 includes a central opening 115 that receives and houses or supports a mechanical splice device 110. The main body structure also clamps the optical fiber cables being spliced in the field. The clamping regions 117a and 117b formed on the ends of the main body 116 can provide further axial strain relief by providing a clamping surface for the strength members of the optical fibers being spliced.

Each clamping region 117a, 117b can further include a mounting structure 118 that provides for coupling to the cable jacket boot 180, 181. In an exemplary aspect, the mounting structure comprises a threaded surface formed on an outer portion of main body 116 that is configured to engage a corresponding threaded surface 184 of the respective boot 180, 181 (see e.g., FIG. 6). Also, the mounting structure 118 can provide a retention area for securing the strength members of the optical fiber cable being spliced.

In addition, each clamping region 117a, 117b can include a fiber guide 113 formed in an interior portion therein to provide axial alignment support for the optical fiber cable being terminated. In an exemplary aspect, the fiber guide portion 113 is a funnel-shaped channel or groove that aligns a buffered portion of the optical fiber and guides the fiber toward the mechanical splice device 110 housed in the main body 116.

Main body 116 can further include one or more stops 114 formed on an interior portion of the clamping regions 117a, 117b to provide a boundary for the insertion of the jacketed portion 136 of the optical fiber cable 134, 135 being spliced. In addition, clamping regions 117a, 117b each include a clamping portion 119 formed at the axial end of the main body. The clamping portions 119 are configured to clamp onto the jacket portion 136 of the optical fiber cables 134, 135 being spliced in device 100. In a preferred aspect, clamping portion 119 comprises a collet-type, split body shape that is actuated when the cable jacket boot 180, 181 is secured to mounting structure 118. The clamping portion 119 can include raised inner surfaces to permit ready clamping of the cable jacket portion 136. In addition, the clamping portion 119 also can provide a guide structure when inserting fiber cable 135 during the splicing process. Thus, cable jacket boots 180, 181 can be utilized to clamp the fiber strength members and the jacket 136 of the respective optical fiber cables. The interaction of the cable jacket boots 180, 181 and the clamping regions 117a, 117b will be described in greater detail below.

According to an exemplary embodiment of the present invention, main body 116 and cover 150 are formed or molded from a polymer material, although metal and other suitably rigid materials can also be utilized. For example, main body 116 can comprise an injection-molded material.

Figure 5:
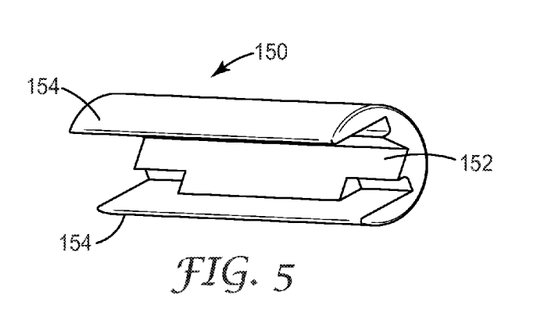
FIG. 5 is an isometric view of a cover piece according to another aspect of the invention.

FIG. 5 shows a close up view of cover 150. Cover 150 is preferably secured to main body 116 via snap fit, although an interference fit construction can also be utilized.

Cover 150 also includes side walls 154 that extend to enclose the opening 115 of the main body 116. Thus, as shown in FIG. 1A, in a preferred aspect, when cover 150 is secured to main body 116, the splice holder device 100 has a compact, smooth, cylindrical shape.

Referring back to FIG. 1B, main body 116 further includes an opening 115 in which a mechanical splice device can be inserted and secured in the central cavity of main body 116. In an exemplary embodiment, the mechanical splice device 110 includes a mechanical splice element, an actuating cap, and a splice support housing to receive the element and actuating cap. In this aspect, as shown in FIG. 5, exemplary cover 150 includes an inner surface 152 having a structure configured to conform with and engage the actuating cap of the mechanical splice device when enclosing the splice holder device.

In general, the mechanical splice device can include a splice element that comprises a sheet of ductile material having a focus hinge that couples two legs, where each of the legs includes a fiber gripping channel (e.g., a V-type (or similar) groove) to optimize clamping forces for conventional glass optical fibers received therein. The ductile material, for example, can be aluminum or anodized aluminum. In addition, a conventional index matching fluid can be preloaded into the V-groove region of the splice element for improved optical connectivity within the splice element. In another aspect, no index matching fluid is utilized.

The mechanical splice device allows a field technician to splice the two bare fiber ends of optical fiber cables at a field installation location. In an exemplary embodiment, the actuating cap is moved to a closed position (e.g. downward in the embodiment depicted in FIG. 2F—in the direction of arrow 107) as the cover 150 is secured onto the main body 116 via a pressing force. This movement causes one or more cam bars located on an interior portion of the actuating cap to slide over the legs of the splice element, urging them toward one another. The two fiber ends are held in place in grooves formed in the splice element and butted against each other and are spliced together in a channel, such as a V-groove channel to provide sufficient optical connection, as the element legs are moved toward one another.

Example mechanical splice devices (also referred to herein as splice devices or splices) include a 3M™ FIBRLOK™ 4×4 mechanical fiber optic splice device, such as is described in U.S. Pat. No. 7,140,787, incorporated by reference herein in its entirety. The 3M™ FIBRLOK™ 4×4 mechanical fiber optic splice device is commercially available from 3M Company, of Saint Paul, Minn. FIG. 1B and FIGS. 2A-2E show an exemplary splice device 110 configured as a 3M™ FIBRLOK™ 4×4 mechanical fiber optic splice device. As shown in FIG. 4A, main body 116 can include a seat or nest 112 that is configured to snugly receive and support a portion of the outer shape of the mechanical splice 110.

Figure 4B:
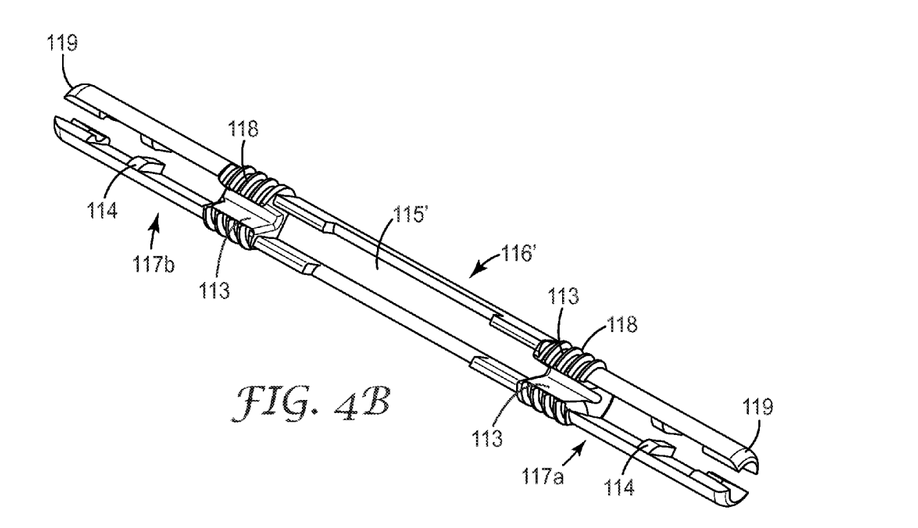
FIG. 4B is an isometric view of an alternative main body of the splice holder device according to another aspect of the invention.

In an alternative aspect, the main body can be configured to receive a different mechanical splice. For example, as shown in FIG. 4B, alternative main body 116' can have an alternative opening 115' that is shaped to receive and support another mechanical splice device, such as a commercially available 3M™ FIBRLOK™ II mechanical fiber optic splice device, available from 3M Company, of Saint Paul, Minn. The operation of a similar mechanical splice device is also described in U.S. Pat. No. 5,159,653, incorporated herein by reference in its entirety.

In further alternative aspects, other conventional mechanical splice devices can be utilized with splice holder device 100, for example those described in U.S. Pat. Nos. 4,824,197; 5,102,212; 5,138,681; and 5,155,787, each of which is incorporated by reference herein, in their entirety.

Figure 6:
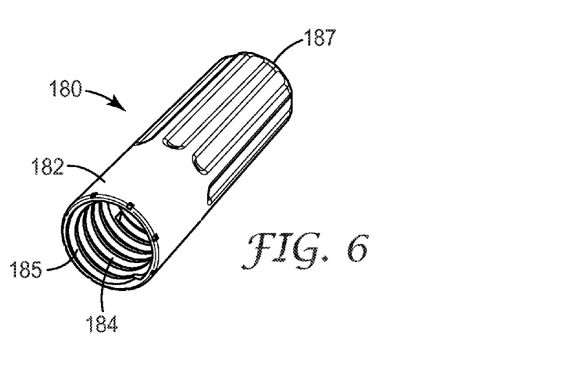
FIG. 6 is an isometric view of a boot according to another aspect of the invention.

The cable jacket boots 180, 181 can each be utilized for several purposes with optical splice holder device 100. Boots 180, 181 can each have the same construction. As shown in FIG. 6 (only boot 180 is shown for simplicity) cable jacket boots 180, 181 can each include a tapered body having an axial bore throughout. Each cable jacket boot 180, 181 includes threaded grooves 184 formed on an inner surface of the body 182 at the opening 185, where the grooves are configured to engage with the correspondingly threaded mounting structure 118 of the main body 116. In addition, the axial length of cable jacket boot 180 can be configured such that a rear section 187 of the boot, which has a smaller opening than at front opening 185, engages the jacket clamp portion 119 of the main body 116. For example, as the cable jacket boot 180, 181 is secured onto the mounting structure 118 of the main body 116, the axial movement of the boot relative to the main body (see arrow 105 in FIG. 2E) forces the legs of clamp portion 119 to move radially inwards (see arrows 106 shown in FIG. 2F) so that the fiber jacket 136 is tightly gripped. Also, the strength members of the optical fiber cable can be disposed between the boot and the threaded mounting structure 118 to secure the strength members as the boot is installed. This construction can also provide a splice capable of surviving rougher handling and greater pull forces.

In an exemplary aspect, cable jacket boots 180, 181 are formed from a rigid material, such as a fiberglass reinforced polymer material. For example, one exemplary material can comprise a fiberglass reinforced polyphenylene sulfide compound material or an ULTEM 2100 (or 1010 or CRS 5001) material. In another aspect, the material used to form the cable jacket boots 180, 181 and the main body 116 is the same material. In an alternative aspect, cable jacket boots 180, 181 may have attached thereto a more flexible secondary boot extending from a back end 187 of the cable jacket boot, thus enabling better response to side pull forces.

Figure 7A:
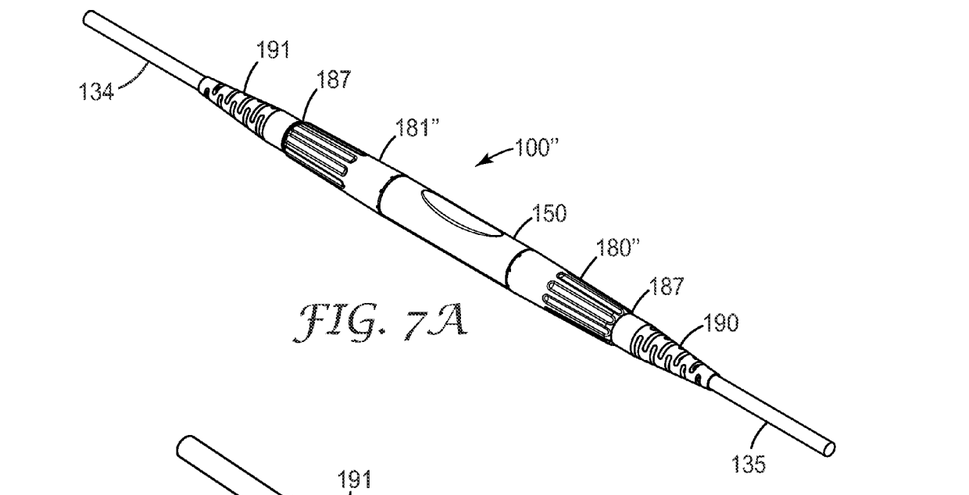
FIG. 7A is an isometric view of an alternative optical fiber splice holder device with a flexible secondary boot extension according to an aspect of the invention.
Figures 7B, 7C:
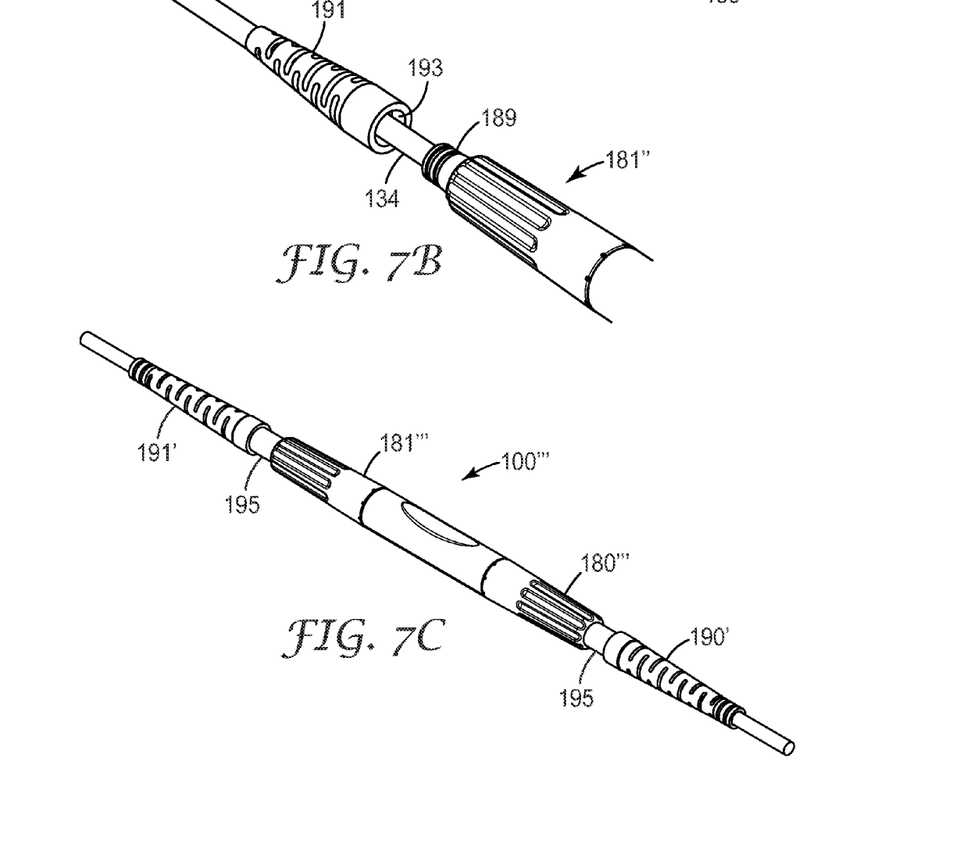
FIG. 7B is a close up view of the cable jacket boot and flexible secondary boot extension of the alternative optical fiber splice holder device of FIG. 7A.
FIG. 7C is an isometric view of another alternative optical fiber splice holder device with an alternative flexible secondary boot extension according to an aspect of the invention.

For example, an alternative aspect of the invention is shown with respect to FIGS. 7A-7C. In FIGS. 7A and 7B, optical fiber splice holder device 100" completes and houses a splice made between two optical fiber cables, here cables 134 and 135. The fibers within each cable are spliced by a mechanical splice device (not shown), similar to those described above. A cover 150, similar to that described above, can be utilized to actuate and enclose the mechanical splice device 110 within the main body. The splice holder main body includes two cable jacket clamping regions, similar to those described above, disposed on either side of the mechanical splice. Each cable jacket clamping region engages with a respective jacket boot 180", 181" that clamps the respective fiber cables in place with respect to the splice. Cable jacket boot 180", 181" are configured to engage a more flexible secondary boot 190, 191 extending from a back end 187 of the boot.

In particular, as is shown in a more close-up view in FIG. 7B (where only cable jacket boot 181" is shown for simplicity, as cable jacket boot 180" may also have the same construction), cable jacket boot 181" includes an engagement portion 189 having a boss structure that engages a corresponding mating structure (not shown) formed on an inner surface of secondary boot 191 near the opening 193. In this configuration, secondary boot 191 can be fitted over fiber 134 and snapped onto the engagement portion 189 during the field splicing process. Secondary boots 190 and 191 can have a slotted outer shape to permit side-to-side bending and can be formed from a flexible material such as a thermoplastic urethane or similar material.

In a further alternative aspect, as is shown in FIG. 7C, an optical fiber splice holder device 100''' can have a configuration similar to that described above with respect to FIGS. 7A and 7B, except that secondary boots 190' and 191' each have a narrow, mating portion 195 that engages engagement portions formed inside the back end of jacket boots 180''' and 181'''.

An exemplary fiber cable utilized in this embodiment comprises a 3.0 mm jacketed drop cable, commercially available from Samsung Cable (of Korea), Thai-han Cable (of Korea), and others. As would be understood by one of ordinary skill in the art given the present description, the optical fiber splice holder device of the exemplary embodiments can be configured to terminate the fibers of other types of jacketed drop cable, including 3.5 mm drop cable, and others.

Figure 3A:
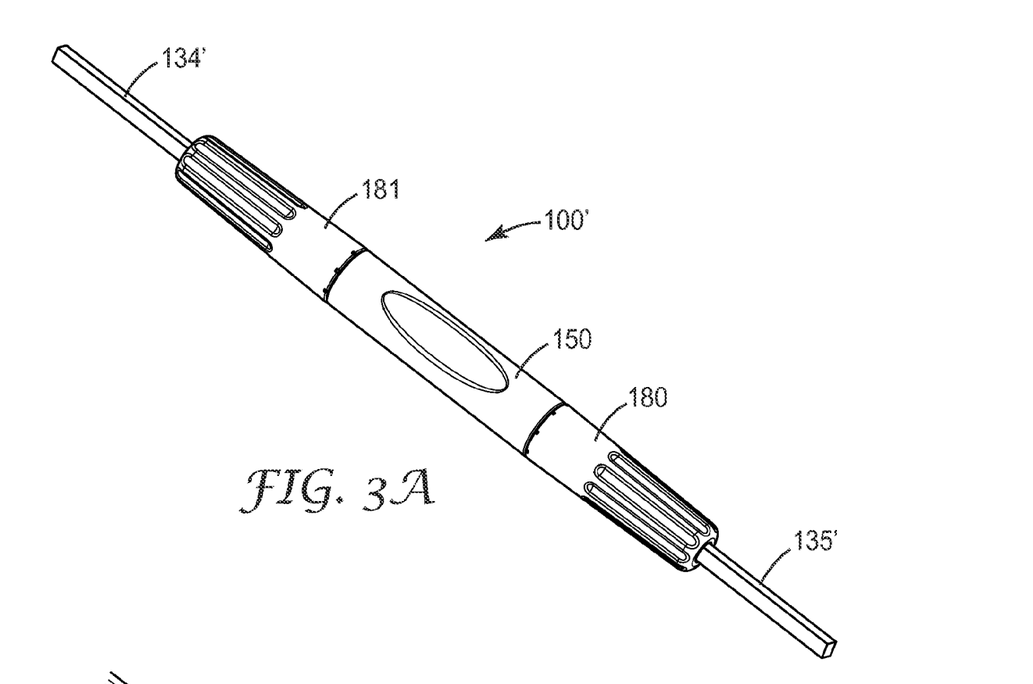
FIGS. 3A and 3B are isometric and close up views of an exemplary optical fiber splice holder device for splicing alternative optical fiber cables according to another aspect of the invention.
Figure 3B:
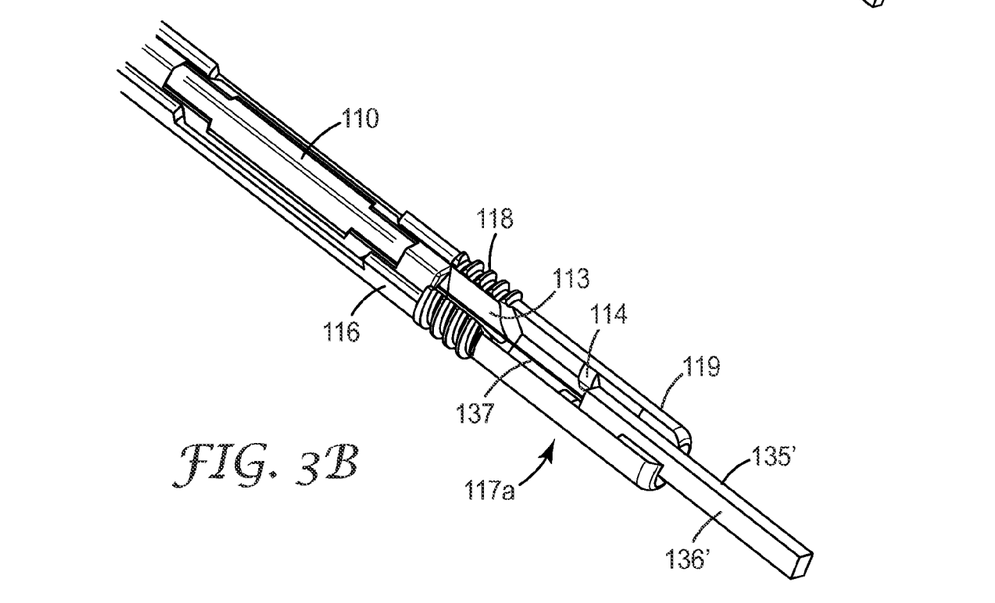

In an alternative aspect, as is shown in FIGS. 3A and 3B, an alternative cable having a rectangular cross section, referred to as an FRP cable, can be utilized. In FIG. 3A, splice holder device 100' completes and houses a splice made between two optical fiber cables, here FRP cables 134' and 135'. A cover 150 can be utilized to actuate and enclose the mechanical splice device within the main body 116. The splice holder main body 116 includes two cable jacket clamping regions (only clamping region 117a is shown in FIG. 3B for simplicity) disposed on either side of the mechanical splice 110. Each cable jacket clamping region engages with a respective cable jacket boot 180, 181 that clamps the respective fiber cables in place with respect to the splice. As shown in FIG. 3B, the outer cable jacket 136' is gripped by a clamping portion 119 formed at the axial end of the main body 116. The fiber guides 113, stops 114 and mounting structure 118 can be constructed in the same manner as is described above for device 100.

As mentioned above, the optical fiber splice holder device of the exemplary embodiments is of compact length and is capable of straightforward field splicing without the use of a connector termination platform or separate crimping tool. An exemplary splicing process is now described with reference to FIGS. 2A-2J. Please note that reference numbers used in these figures correspond with like features from FIGS. 1A, 1B and 4-6.

Figures 2A, 2B:
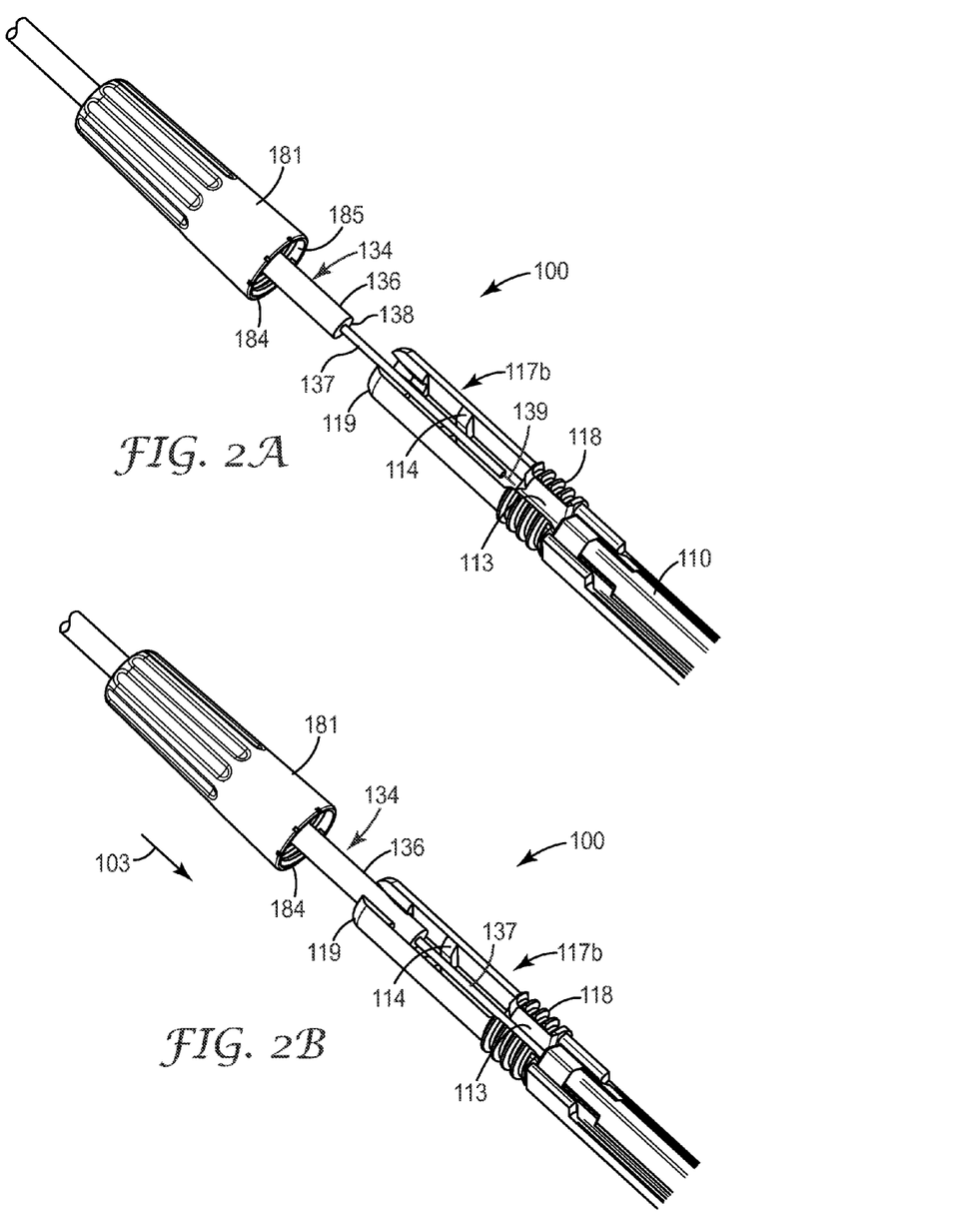
FIGS. 2A-2J illustrate an exemplary splicing sequence for the optical fiber splice holder device according to another aspect of the invention.

As shown in FIG. 2A, an optical fiber cable 134 is prepared by removing a portion of the fiber cable jacket 136 to expose a buffer portion 137 and stripping off a portion of the buffer coating near the fiber end to leave a bare fiber portion 139. Also, strength members, such as aramid strands (not shown), that were disposed between the cable jacket 136 and the buffer portion 137 can be exposed. The end of the bare fiber (not shown) is cleaved either as a flat cleave or an angled cleave using a conventional cleaver. Optionally, the fiber end may also be polished using a conventional field polisher tool and/or process. The bare fiber end of cable 134 is then inserted into the splice element of the mechanical splice device 110. In an exemplary aspect, about 50 mm of the jacket 136 can be removed. The stripped fiber can have a length of about 30 mm to about 40 mm, with about 10 mm of bare glass exposed at its end. For example, a commercial fiber cleaver such as an Ilsintech MAX CI-01 or the Ilsintech MAX CI-08, available from Ilsintech (Korea) (not shown) can be utilized to provide a flat or an angled cleave. The cable jacket boot 181 can be slid over the fiber cable 134 for later use. In one aspect, the cable jacket boot 181 can be slid over the fiber cable 134 prior to cleaving/polishing.

As shown in FIG. 2B, optical fiber cable 134 can be inserted in the direction of arrow 103 through the clamping region 117b of the main body 116 so that the bare fiber is inserted into the splicing element of the mechanical splice device 110. The jacket stops 114 in the clamping region 117b can provide a stop for the insertion of the fiber as the end 138 of the jacket of cable 134 contacts the stops 114. At this position, the bare end of optical fiber cable 134 is positioned well within the splice element of the mechanical splice device 110, ready for splicing with the bare end of the second optical cable 135.

Figure 2C:
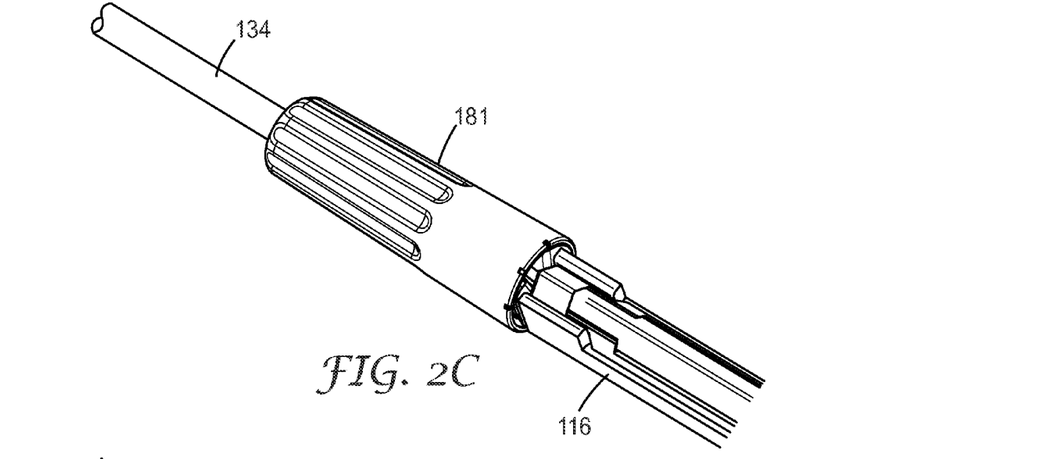

As shown in FIG. 2C, cable jacket boot 181 is slid into position and fastened onto clamping region 117b, for example, by screwing cable jacket boot 181 onto mounting structure 118. This fastening secures the strength members of optical fiber cable 134 onto the clamping region 117b of the main body 116 and axially secures the jacket portion 136 of the optical fiber cable 134 with respect to the main body 116. Any remaining unsecured strength members may be cut off.

The second optical fiber cable 135 can be prepared by removing a portion of the fiber cable jacket 136 to expose a buffer portion 137 and stripping off a coated portion of the fiber near the fiber end to leave a bare fiber portion (not shown). Also, strength members, such as aramid strands (not shown), that were disposed between the cable jacket 136 and the buffer 137 can be exposed. The end of the bare fiber (not shown) is cleaved either as a flat cleave or an angled cleave using a conventional cleaver. Optionally, the fiber end may also be polished using a conventional field polisher tool and/or process. These processes can be performed in the same manner as is described above. The cable jacket boot 180 can be slid over the fiber cable 135 for later use.

Figure 2D:
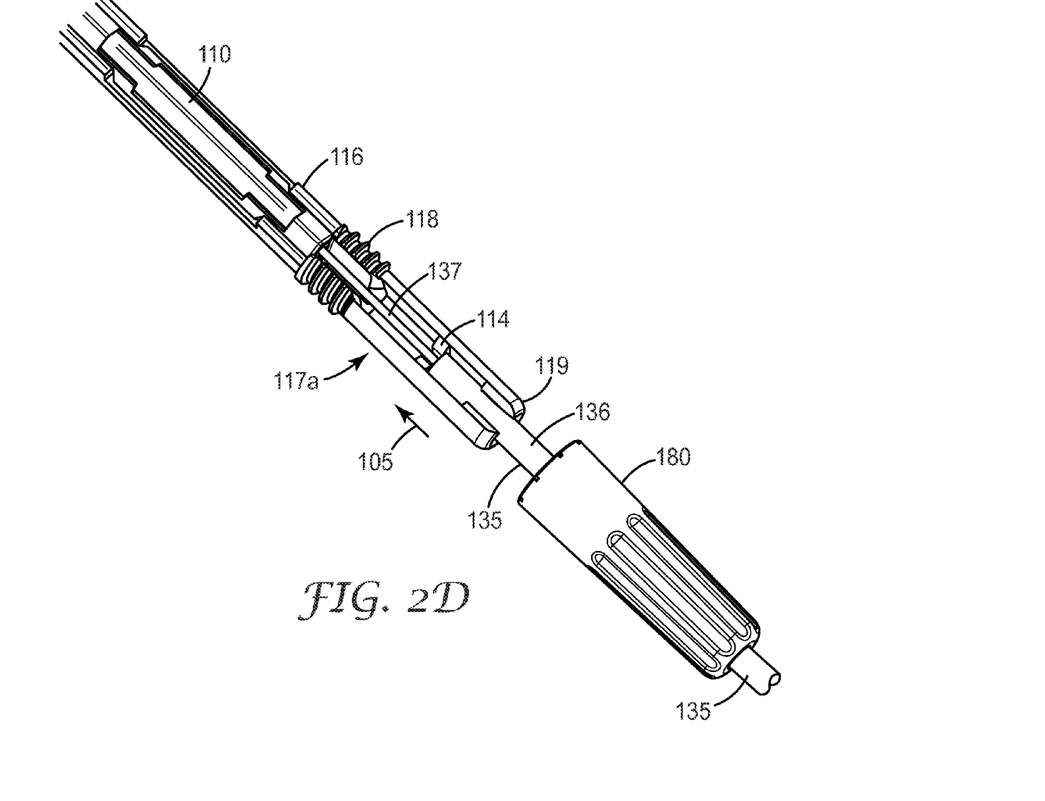

As shown in FIG. 2D, optical fiber cable 135 can be inserted in the direction of arrow 105 through the clamping region 117a of the main body 116 so that the bare fiber is inserted into the splicing element of the mechanical splice device 110. The insertion process continues as the bare end of optical fiber cable 135 contacts the bare end of optical fiber cable 134 already inserted into the splice element of the mechanical splice device 110.

Figure 2E:
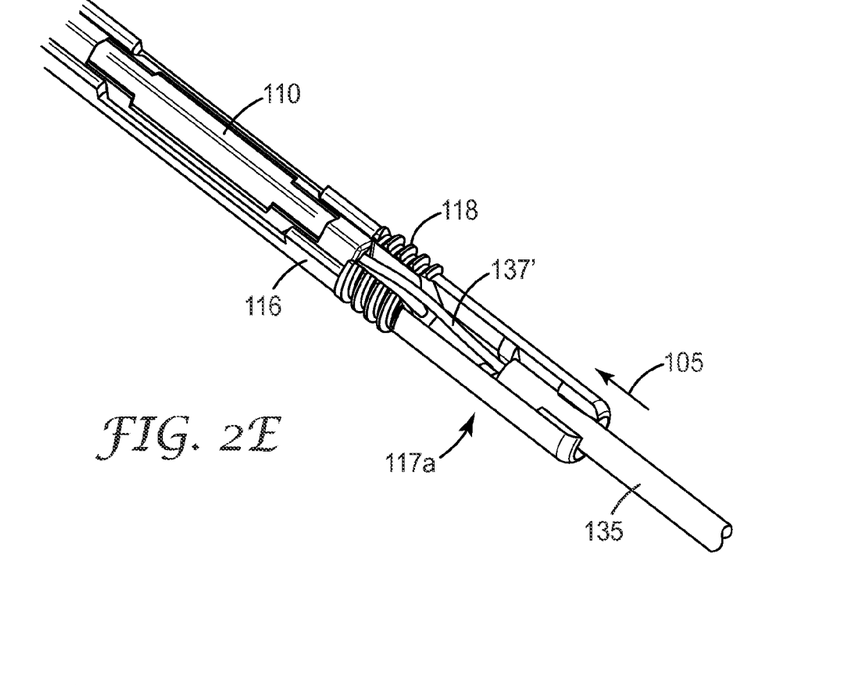

As shown in FIG. 2E, upon contact between the bare end of optical fiber cable 135 and the bare end of optical fiber cable 134, a fiber bend 137' occurs as axial force in the direction of arrow 105 is maintained.

Figure 2F:
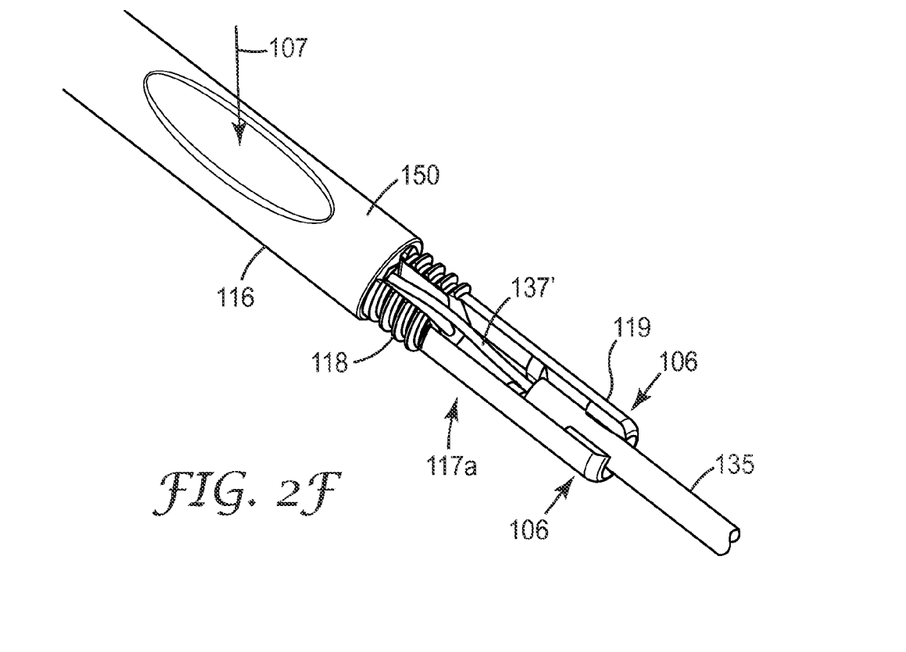
Figure 2G:
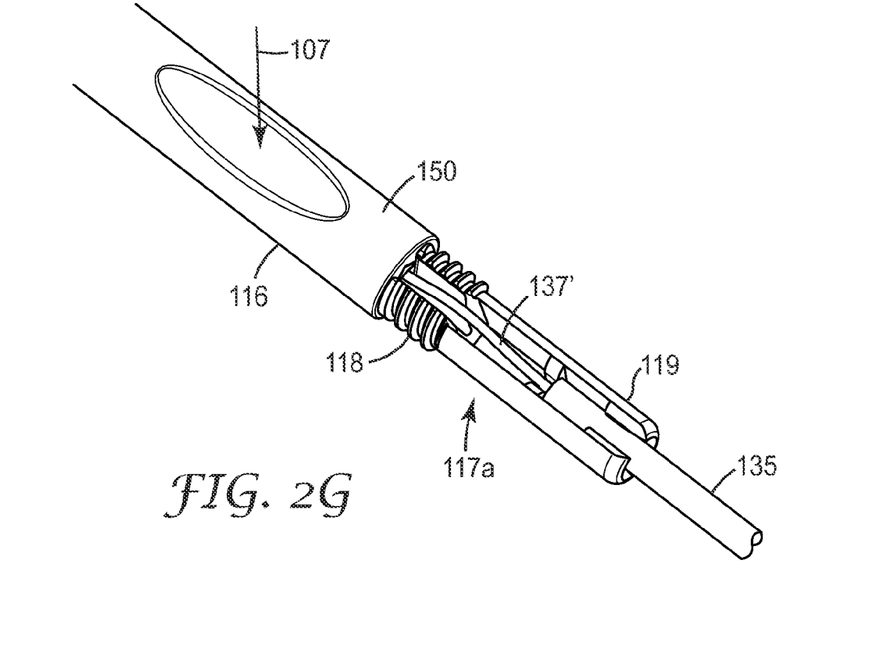
Figure 2H:
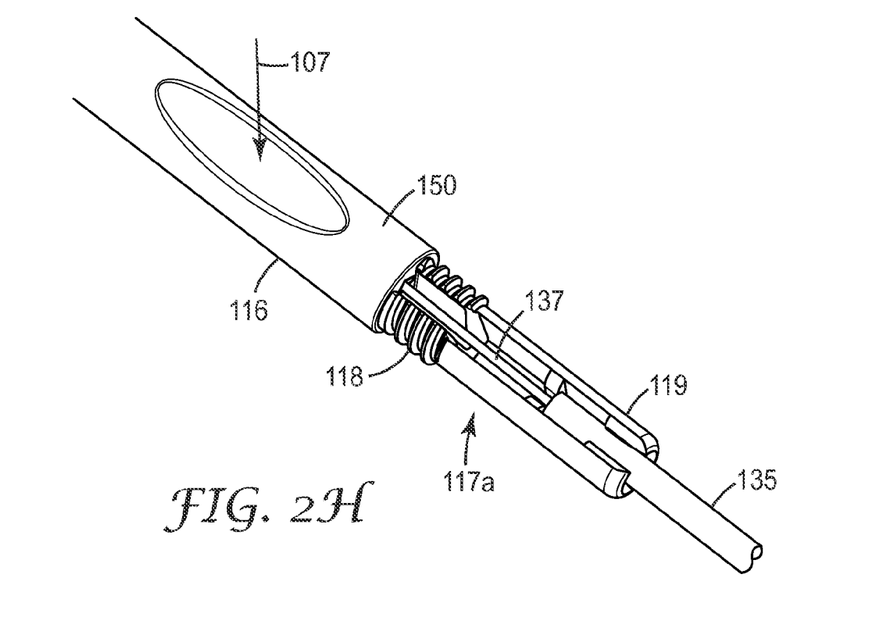

As shown in FIG. 2F, the splice device can be actuated in the following manner. A retaining force can be applied to optical fiber cable 135 via a pressing of the clamping portion 119 formed at the axial end of the main body 116 in the direction of arrows 106. This retaining force can be applied with a simple finger pinching motion. While the retaining force is maintained, the cover 150 can be moved into place on main body 116. As shown in FIG. 2G, a further pressing force, in the direction of arrow 107 shown in FIG. 2G, fully actuates the actuating cap of the mechanical splice device 110 such that the splice element therein is fully closed, keeping the bare fiber ends in contact. In FIG. 2H, the retaining force can be removed at the clamping portion 119, allowing the optical fiber cable to move back axially, thereby substantially releasing the previously formed bend 137'.

Figure 2I:
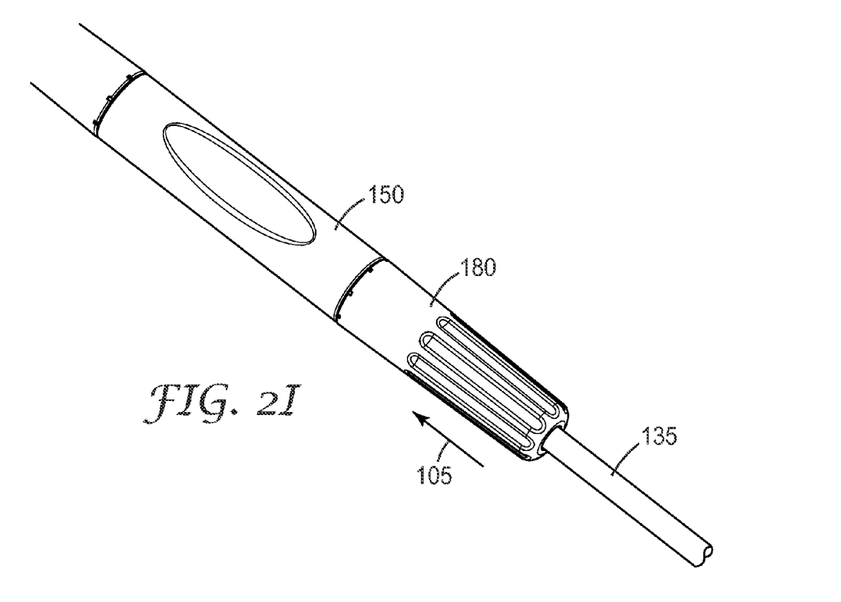
Figure 2J:
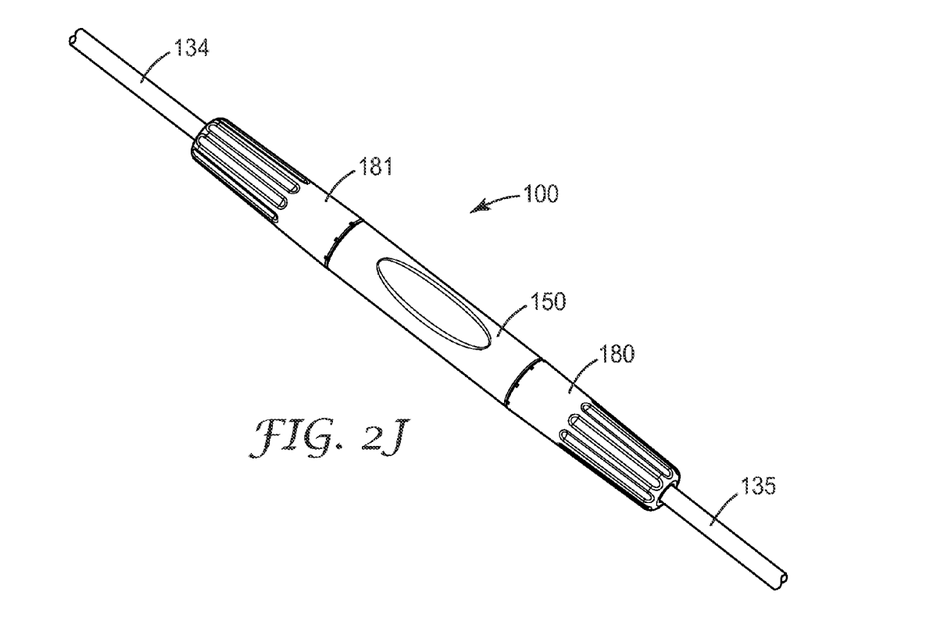

As shown in FIG. 2I, cable jacket boot 180 is slid into position and fastened onto clamping region 117a, for example, by screwing cable jacket boot 180 onto mounting structure 118. This fastening secures the strength members of optical fiber cable 135 onto the clamping region 117a of the main body 116 and axially secures the jacket portion 136 of the optical fiber cable 135 with respect to the main body 116. Any remaining unsecured strength members may be cut off. FIG. 2J shows device 100 in its fully installed state.

As would be apparent to one of ordinary skill in the art given the present description, the above method may be modified so that the installation steps may be modified and/or performed in a different sequence.

Thus, the above procedure can be accomplished without the use of any additional installation platform or specialized tool. In addition, the optical splice holder device is re-usable. The device offers a low-cost approach to repair a broken optical fiber cable, such as a broken drop cable. In addition, the construction of the splice holder device allows for the device to be pre-installed on a cable used for later splicing.

The optical splice holder device described above can be used in many conventional splicing applications. The optical fiber splice holder devices described above can also be utilized for FTTH drop splicing or jacketed cable splicing.

Various modifications, equivalent processes, as well as numerous structures to which the present invention may be applicable will be readily apparent to those of skill in the art to which the present invention is directed upon review of the present specification.

We claim:

1. An optical fiber splice holder device for housing a splice between first and second optical fibers of first and second optical fiber cables, the first and second optical fiber cables each including a fiber portion surrounded by buffer portion and an outer jacket surrounding the buffer and fiber portions, the splice holder comprising:

a housing comprising a cover and a main body, the main body configured to contain a splice device disposed therein in a splice device housing portion of the main body portion, the splice device configured to splice the first and second optical fibers, wherein the cover is configured to be received by the main body to substantially enclose the main body upon application of a pressing force, wherein the main body also includes first and second cable jacket clamping regions formed on the ends of the main body and disposed on either side of the mechanical splice, the first cable jacket clamping region configured to clamp the jacketed portion of the first optical fiber cable containing the first optical fiber and the second cable jacket clamping region configured to clamp the jacketed portion of the second optical fiber cable containing the second optical fiber; and a first boot attachable to the first cable jacket clamping region and a second boot attachable to the second cable jacket clamping region of the main body, wherein the cable jacket boots are configured to clamp the first and second cable jacket clamping regions onto respective jacketed portions via axial movement relative to the main body.

2. The optical fiber splice holder device of claim 1, wherein the first boot retains a strength member of the first optical fiber cable against the first cable jacket clamping region of the main body and wherein the second boot retains a strength member of the second optical fiber cable against the second cable jacket clamping region of the main body.

3. The optical fiber splice holder device of claim 1, wherein the splice device comprises a mechanical splice device having a splice element and an actuating cap, wherein the cover is configured to actuate the actuating cap when the cover is secured onto the main body by the pressing force.

4. The optical fiber splice holder device of claim 1, wherein the first and second cable jacket clamping regions each comprise a clamping portion formed at an end thereof, wherein each clamping portion comprises a collet-type, split body shape.

5. The optical fiber splice holder device of claim 1, wherein each boot attaches to the cable jacket clamping region via a screw-type mechanism.

6. The optical fiber splice holder device of claim 1, wherein the cable jacket clamping regions each include stops formed on an inner surface thereof to prevent passage of a jacketed fiber from further insertion.

7. The optical fiber splice holder device of claim 3, wherein the cover includes an inner surface having a structure configured to conform with and engage the actuating cap of the mechanical splice device when enclosing the optical fiber splice holder device.

8. The optical fiber splice holder device of claim 4, wherein a rear section of the first and second boots has a smaller opening than a front section opening, and wherein the rear section engages the clamping portions of the main body.

9. The optical fiber splice holder device of claim 1, wherein at least one of the first and second boots engages a flexible secondary boot extending from a back end of the at least one boot.

10. The optical fiber splice holder device of claim 1, wherein the cable jacket clamping regions each include stops formed on an inner surface thereof to prevent passage of a jacketed fiber from further insertion.

11. An optical fiber splice holder device for housing a splice between first and second optical fibers of first and second optical fiber cables, the first and second optical fiber cables each comprising FRP cables having a rectangular-shaped outer cable jacket surrounding the fiber portions, the splice holder comprising:

a housing having a main body configured to contain a splice device disposed therein in a splice device housing portion of the main body portion, the splice device configured to splice the first and second optical fibers, wherein the cover is configured to be received by the main body to substantially enclose the main body upon application of a pressing force, wherein the main body also includes first and second cable jacket clamping regions formed on the ends of the main body and disposed on either side of the mechanical splice, the first cable jacket clamping region configured to clamp the jacketed portion of the first FRP cable containing the first optical fiber and the second cable jacket clamping region configured to clamp the outer jacketed portion of the second FRP cable containing the second optical fiber; and a first boot attachable to the first cable jacket clamping region and a second boot attachable to the second cable jacket clamping region of the main body, wherein the cable jacket boots are configured to clamp the first and second cable jacket clamping regions onto respective outer jacket portions via axial movement relative to the main body.

12. The optical fiber splice holder device of claim 11, wherein the first and second cable jacket clamping regions each comprise a clamping portion formed at an end thereof, wherein each clamping portion comprises a collet-type, split body shape.

13. The optical fiber splice holder device of claim 11, wherein each boot attaches to the cable jacket clamping region via a screw-type mechanism.

* * * * *